(12) United States Patent
Kuroda et al.

(10) Patent No.: US 8,774,159 B2
(45) Date of Patent: Jul. 8, 2014

(54) COMMUNICATION APPARATUS ENABLING COEXISTENCE OF SYSTEMS

(75) Inventors: Go Kuroda, Osaka (JP); Akio Kurobe, Osaka (JP); Koji Ikeda, Osaka (JP); Hisao Koga, Fukuoka (JP); Yuji Igata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 786 days.

(21) Appl. No.: 12/976,226

(22) Filed: Dec. 22, 2010

(65) Prior Publication Data

US 2011/0090067 A1 Apr. 21, 2011

Related U.S. Application Data

(62) Division of application No. 11/439,251, filed on May 24, 2006, now Pat. No. 7,885,246.

(30) Foreign Application Priority Data

May 26, 2005 (JP) .................................. 2005-154500
Mar. 24, 2006 (JP) .................................. 2006-083657

(51) Int. Cl.
 *H04B 7/212* (2006.01)
 *H04B 7/26* (2006.01)
(52) U.S. Cl.
 CPC .................................... *H04B 7/2643* (2013.01)
 USPC ......................................................... 370/347
(58) Field of Classification Search
 CPC .................................................... H04B 7/2643
 USPC ........... 370/437, 445, 450, 462; 455/10, 13.1,
 455/13.4, 62, 69, 440, 450, 511, 515, 546,
 455/522
 See application file for complete search history.

(56) References Cited

U.S. PATENT DOCUMENTS

| | | | |
|---|---|---|---|
| 5,719,868 | A | 2/1998 | Young |
| 5,852,405 | A | 12/1998 | Yoneda et al. |
| 6,198,924 | B1 | 3/2001 | Ishii et al. |
| 6,292,494 | B1 | 9/2001 | Baker et al. |
| 6,704,346 | B1 | 3/2004 | Mansfield |
| 6,977,913 | B1 | 12/2005 | Ishii et al. |
| 7,039,414 | B1 | 5/2006 | Nasshan |
| 7,174,170 | B2 | 2/2007 | Steer et al. |

(Continued)

FOREIGN PATENT DOCUMENTS

| | | |
|---|---|---|
| CN | 1454437 | 11/2003 |
| JP | 8-256153 | 10/1996 |
| JP | 2000-151547 | 5/2000 |
| JP | 2007-19618 | 1/2007 |

OTHER PUBLICATIONS

International Search Report issued Oct. 11, 2006 in International (PCT) Application No. PCT/JP2006/310837.

(Continued)

*Primary Examiner* — Phuongchau B Nguyen
(74) *Attorney, Agent, or Firm* — Wenderoth, Lind & Ponack, L.L.P.

(57) ABSTRACT

A frequency band is divided into N subchannels. Sub-channels are first allocated for a power line communication system having a higher priority, such as public communication or the like. Sub-channels for a power line communication system having a relatively low priority, such as in-home communication or the like, are allocated from free subchannels. In this case, the subchannels used by the power line communication system having the high priority are limited to a plurality of consecutive subchannels from an upper side or a lower side of the frequency band.

18 Claims, 16 Drawing Sheets

(56) References Cited

U.S. PATENT DOCUMENTS

| | | |
|---|---|---|
| 7,346,021 B2 | 3/2008 | Yoshizawa et al. |
| 7,359,398 B2 | 4/2008 | Sugaya |
| 2003/0038710 A1 | 2/2003 | Manis et al. |
| 2005/0047383 A1 | 3/2005 | Yoshida |
| 2005/0185629 A1 | 8/2005 | Kuroda et al. |
| 2006/0251098 A1 | 11/2006 | Morioka |
| 2007/0064783 A1 | 3/2007 | Kuroda et al. |

OTHER PUBLICATIONS

"Powerline Telecommunications (PLT); Coexistence of Access and In-House Powerline Systems", ETSI TS 101 867, ETSI Standards, European Telecommunications Standards Institute, Sophia-Antipo, FR, vol. PLT, No. V111, Nov. 2000, XP014006769, ISSN: 0000-0001, pp. 1-11.

Yu-Ju Lin et al., "A Comparative Performance Study of Wireless and Power Line Networks", IEEE Communications Magazine, IEEE Service Center, New York, NY, US, vol. 41, No. 4, Apr. 2003, pp. 54-63, XP001166422, ISSN: 0163-6804.

Universal Powerline Association: "Powerline Communication System—Access/In-home & In-home/In-home coexistence mechanism—General specifications, Ver. 1.0" [Online] Jun. 27, 2005, XP002396471, Retrieved from the Internet: URL:http://www.upaplc.org/download_file.asp?file=/upa_coex_group_general_specs_1.0.1.pdf> [retrieved on Aug. 8, 2006], pp. 1-34.

FIG. 6

| H1、H2、H3、H4 | FREQUENCY BAND WHICH IS USED |
|---|---|
| 0、0、0、0 | 2 MHz ~ 16 MHz |
| 1、0、0、0 | 2 MHz ~ 14 MHz |
| 1、1、0、0 | 2 MHz ~ 12 MHz |
| 1、1、1、0 | 2 MHz ~ 10 MHz |
| 1、1、1、1 | 2 MHz ~ 8 MHz |

FIG. 7

| | A | H1 | H2 | H3 | H4 |
|---|---|---|---|---|---|
| #y | 0 | 1 | 1 | 0 | 1 |
| #x | 1 | 1 | 1 | 0 | 0 |

FIG. 11

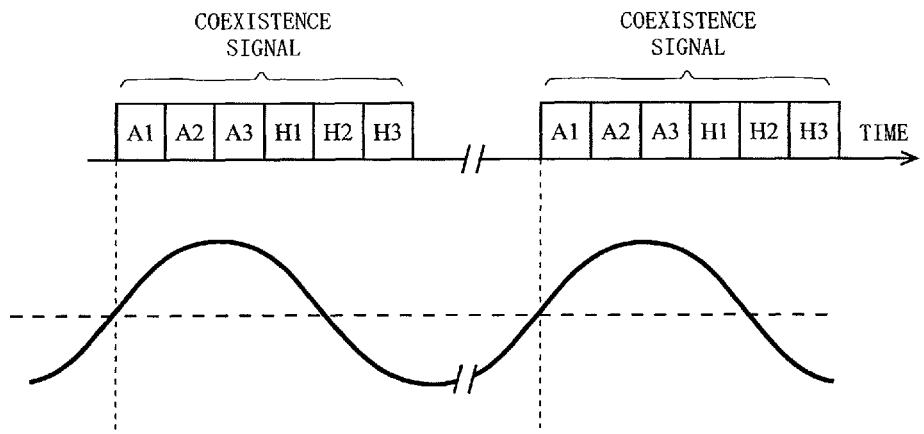

FIG. 12A

|  |  | A1−A2 | | | |
|---|---|---|---|---|---|
|  |  | 0 0 | 0 1 | 1 0 | 1 1 |
| A3 | 0 | (NO ACCESS SYSTEM) | #11−#14 ARE USED | #10−#14 ARE USED | #9−#14 ARE USED |
|  | 1 | #1−#3 ARE USED | #1−#4 ARE USED | #1−#5 ARE USED | #1−#6 ARE USED |

FIG. 12B

OTHER THAN {A1, A2, A3}={0, 0, 0}

|  |  | H1−H2 | | | |
|---|---|---|---|---|---|
|  |  | 0 0 | 0 1 | 1 0 | 1 1 |
| H3 | 0 | (NO PRIORITY IN-HOME SYSTEM) | 2 UPPER-SIDE CHANNELS ARE USED | 3 UPPER-SIDE CHANNELS ARE USED | 4 UPPER-SIDE CHANNELS ARE USED |
|  | 1 | 1 LOWER-SIDE CHANNEL IS USED | 2 LOWER-SIDE CHANNELS ARE USED | 3 LOWER-SIDE CHANNELS ARE USED | 4 LOWER-SIDE CHANNELS ARE USED |

FIG. 12C

OTHER THAN {A1, A2, A3}={0, 0, 0}

|  |  | H1−H2 | | | |
|---|---|---|---|---|---|
|  |  | 0 0 | 0 1 | 1 0 | 1 1 |
| H3 | 0 | (NO PRIORITY IN-HOME SYSTEM) | 7 UPPER-SIDE CHANNELS ARE USED | 8 UPPER-SIDE CHANNELS ARE USED | 9 UPPER-SIDE CHANNELS ARE USED |
|  | 1 | 6 LOWER-SIDE CHANNEL IS USED | 7 LOWER-SIDE CHANNELS ARE USED | 8 LOWER-SIDE CHANNELS ARE USED | 9 LOWER-SIDE CHANNELS ARE USED |

FIG. 14
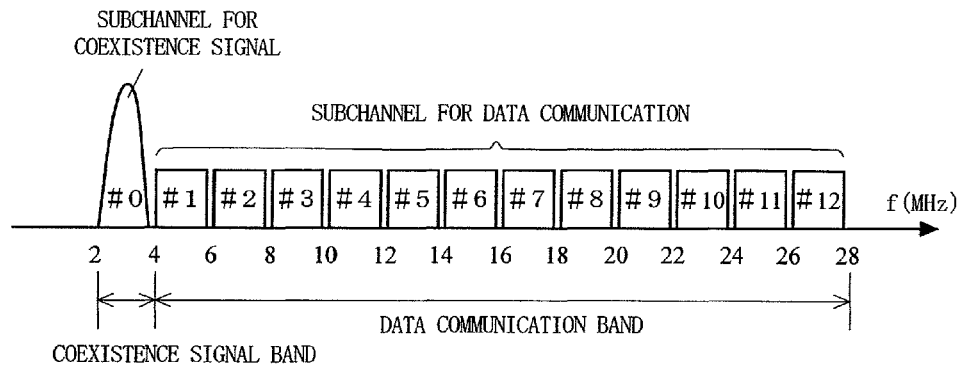
FIG. 15
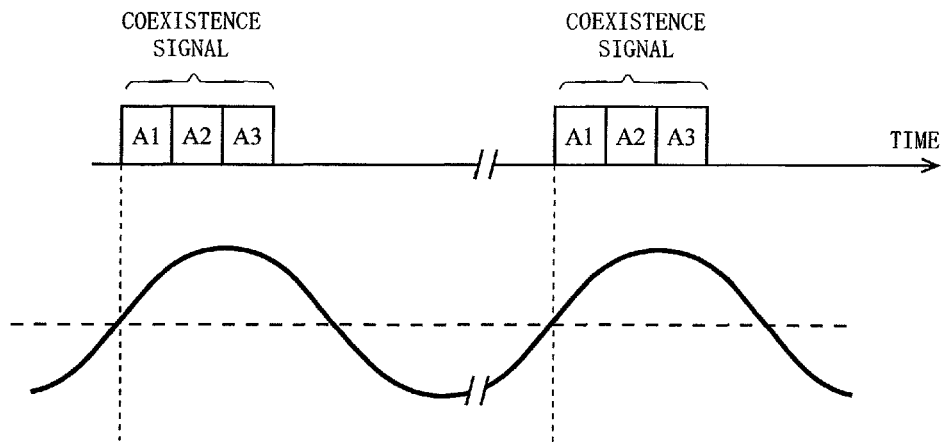
FIG. 16
|  | A1−A2 | | | |
|---|---|---|---|---|
|  | 0 0 | 0 1 | 1 0 | 1 1 |
| A3 0 | (NO ACCESS SYSTEM) | #9-#12 ARE USED | #8-#12 ARE USED | #7-#12 ARE USED |
| A3 1 | #1-#3 ARE USED | #1-#4 ARE USED | #1-#5 ARE USED | #1-#6 ARE USED |

FIG. 21  PRIOR ART
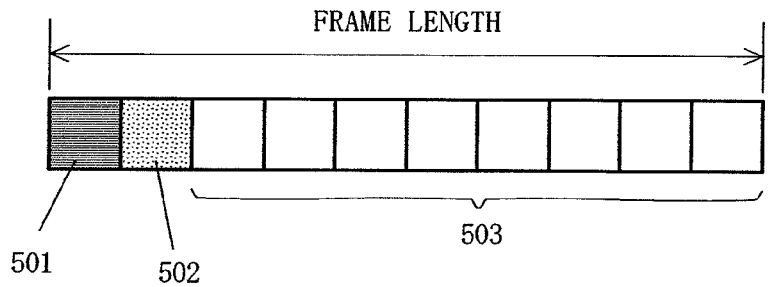
FIG. 22  PRIOR ART
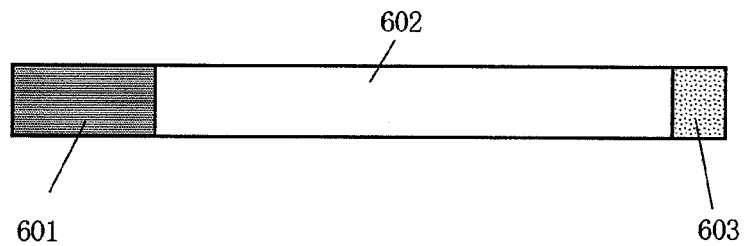
FIG. 23  PRIOR ART
|  | DATA TRANSMISSION RATE | MAXIMUM TOLERABLE DELAY |
|---|---|---|
| AV STREAM | 24Mbps | 300msec |
| TWO-WAY AUDIO | 64kbps×2 | 10msec |

COMMUNICATION APPARATUS ENABLING COEXISTENCE OF SYSTEMS

This is a Rule 1.53(b) Divisional of application Ser. No. 11/439,251, filed May 24, 2006 now U.S. Pat. No. 7,885,246.

BACKGROUND OF THE INVENTION

1. Field of the Invention

The present invention relates to a communication apparatus which enables coexistence of systems, and more particularly to a communication system which enables an access system which is used in common by a plurality of users and in-home systems which are used separately by the respective users to coexist on the same communication medium, such as a power line or the like.

2. Description of the Background Art

Power Line Communications (PLC) has attracted attention as a technology for connection of a network apparatus, such as a broadband router or the like, so as to access from a Personal Computer (PC) or the like in a home to the Internet. In the power line communication, since an existing power line is used as a communication medium, it is not necessary to construct a new infrastructure, and high-speed communication can be achieved by inserting an AC mains plug into an AC mains outlet in a home. Therefore, research and development, and demonstration experiments have been vigorously conducted all over the world, and in Europe and the USA, and a number of PLC projects have already been commercialized.

FIG. 18 is a diagram illustrating a general configuration when a PC is used to access from a home to the Internet.

A PC 201 which is used by a user in a home is connected via an Ethernet 211 to a broadband router 202, through which the PC 201 is connected via an access line 212 to the Internet 222. As the access line 212, ADSL (Asymmetric Digital Subscriber Line), FTTH (Fiber To The Home) or the like is generally used. Here, it is often that a place where the access line 212 is withdrawn into the home is different from a room where the PC 201 is placed. In this case, a cable of the Ethernet 211 needs to be extended from the broadband router 202 to the PC 201.

In the field of power line communication, in order to reduce the extension, a conversion adaptor (hereinafter referred to as a P/E conversion adaptor) of power line communication and Ethernet has been commercialized. FIG. 19 illustrates a general configuration related to access to the Internet when the P/E conversion adaptor is used.

A PC 301 which is used by a user in a home is connected via an Ethernet 311 to a P/E conversion adaptor 303, through which the PC 301 is connected via an outlet to an in-home power line 314. Data is transferred to a P/E conversion adaptor 304 for a broadband router 302 by power line communication. The P/E conversion adaptor 304 is connected via an Ethernet 313 to the broadband router 302. The broadband router 302 is connected via an access line 312 to the Internet 322.

Also, a technology for utilizing power line communication as an access system has been developed. FIG. 20 is a diagram illustrating an exemplary configuration where a high-speed power line technology is used for both an in-home system and an access system when the Internet is accessed from a PC in a home. Here, a PC 401 which is used by a user in a home is assumed to have an in-home-system high-speed power line communication function.

An in-home system employing power line communication refers to a communication network which is composed of an in-home power line 411 (transmission medium) and an apparatus connected to a power line outlet provided in a home (including an outer wall). A logical configuration range of the in-home system is the inside of a house, and is used for AV streaming, audio transmission, broadband internet access, home control, and the like.

On the other hand, an access system employing power line communication refers to a communication network which is composed of a low-voltage power distribution line 412 from home to a pole transformer provided on an outdoor utility pole and an in-home power line 411 (transmission media), and an in-home apparatus 403 provide in a home and an apparatus provided outdoors, and in some cases, may include an intermediate-voltage power distribution line 413 from the pole transformer to an electric power substation. A configuration range of the access system ranges from the in-home apparatus 403 to a connection point of the Internet, and is used for a broadband internet service, an audio service (VoIP), a video service (IPTV, IP broadcasting), and the like.

When an access system employing power line communication is applied to a building or an apartment house, an in-home apparatus provided in each room of the building or each apartment of the apartment house and a power distribution line in the building or the apartment house constitute the access system.

The PC 401 performs data communication with a router 402 having an in-home-system high-speed power line communication function, via an AC mains outlet connected to the in-home power line 411. The router 402 is connected via an Ethernet 414 to an in-home apparatus 403 having an access-system high-speed power line communication function. The in-home apparatus 403 communicates with an access-system high-speed power line communication apparatus provided in a pole transformer 404 on a utility pole, via the low-voltage power distribution line 412 extended from the inside to the outside of the house. The Internet is accessed from the pole transformer 404, using an optical fiber or the like.

In this case, the same power line is used in communication between the PC 401 and the router 402, and communication between the access-system in-home apparatus 403 and the access-system communication apparatus included in the pole transformer 404. In this case, if both the communications are based on the same communication scheme, media access in which a communication medium is used in common by means of Time Division Multiplexing (TDM) or Frequency Division Multiplexing (FDM) is easily achieved by exchanging a predetermined signal. However, a variety of power line communication schemes have already been actually developed, and a plurality of schemes are considered to be introduced in the future. Therefore, it cannot be necessarily expected that a power line communication scheme which is used in in-home-system communication and a power line communication scheme which is used in access-system communication are based on the same technology. Also, in in-home-system communication, it is highly likely that power line communication based on a plurality of different techniques coexist. However, for communication apparatuses which cannot communicate with each other, it is difficult to allocate the resource of a communication medium in a temporal or frequency-spatial manner.

To solve such a problem, it is considered that a coexistence signal which has a simple configuration is defined, and communication apparatuses employing various power line communication schemes are enabled to transmit and receive the coexistence signal, thereby allocating the resource of a power line communication medium in a temporal or frequency-spatial manner.

For example, in Patent Document 1 (Japanese Patent Laid-Open Publication No. 2000-151547), a communication terminal employing an OFDM technique transmits and receives a signal including a frame synchronization signal using only a specific subcarrier. The communication terminal uses the signal to establish synchronization between an access-system base station and an in-home-system base station, and thereafter, the access-system base station allocates a time slot to the in-home system. Thereby, it is possible that, while the access system and the in-home system coexist in the time domain, the access system which is expected to be used in common to a plurality of homes, uses a power line communication medium with a higher priority than that of the in-home system.

FIG. 21 is a diagram illustrating a frame structure employed in Patent Document 1. In Patent Document 1, communication is performed by repeating the frame of FIG. 21. In FIG. 21, a synchronization slot 501 is used to establish synchronization between an access system and an in-home system, and includes a specific synchronization signal. Thereby, the access system and the in-home system can be synchronized with each other in units of a frame. Next, a control slot 502 is used to inform how the following data slot 503 is used by the access system and the in-home system. A base station of the access system uses this slot to inform each base station of the in-home system of an available slot. With the above-described mechanism, the coexistence in the time domain of the access system and the in-home system is secured.

However, such coexistence due to TDM is disadvantageous with respect to communication for which QoS (Quality of Service) needs to be taken into consideration.

The QoS of communication is represented by a data transmission rate, a tolerable maximum transmission delay, or the like. As general applications, there are AV stream transmission which can relatively tolerate a delay, though a high data transmission rate needs to be secured, and two-way audio data transmission which has a strict requirement for limitation on delay, though a data transmission rate is low. Further, an application, such as a high-definition video telephone or the like, is considered which needs to simultaneously satisfy a relatively high transmission rate and a strict requirement for limitation on delay.

Here, a general frame structure in digital data communication is illustrated in FIG. 22. Digital data communication is generally performed in units of a frame of FIG. 22. The frame can be divided into a header 601 which uses a modulation technique which is relatively robust against noise (i.e., a low transmission rate), a payload 602 which is an area for carrying user data or the like, and an error detection/correction code 603 which is used by a reception apparatus to detect whether or not the payload 602 has been contaminated with a transmission error during transmission, or correct the transmission error. Here, the header 601 has a fixed length, and in this portion, a fixed modulation technique having a low transmission rate is often used. The payload 602 often has a variable length, and a modulation technique used therein and a size thereof are generally described in the header 601. The error detection/correction code 603 has a limitation on an amount of error which can be detected/corrected, and if the number of error bits occurring in the payload 602 is within a range which enables error detection/correction, detection/correction can be achieved.

In such digital data transmission, since the header 601 has a fixed length and the payload 602 has a variable length, the transmission efficiency increases (i.e., a larger user data which can be transmitted within a predetermined time) with an increase in the proportion of the payload 602 occupying a frame. Conversely, as the payload 602 is increased, the amount of transmission errors occurring in the payload 602 increases, and therefore, when the payload 602 is received by a reception apparatus, the possibility increases that the amount of transmission errors occurring in the payload 602 exceeds the detection/correction capability of the error detection/correction code 603. For digital data transmission, it is important to establish a balance between the large payload and the transmission error so as to achieve maximum data transmission efficiency.

In view of the above description, it is preferable that a frame having a relatively large payload be used for AV stream transmission requiring a high data transmission rate, and a frame having a small payload be used for two-way audio data transmission requiring a low data transmission rate.

It is here assumed that there are two data streams which have QoS requirements of FIG. 23, i.e., an AV stream which has a data transmission rate of 24 Mbps and tolerates a maximum delay of 300 msec, and a two-way stream having two pieces of audio data which have a data transmission rate of 64 kbps and tolerate a maximum delay of as small as 10 msec.

It is also assumed that, in an environment where the access-system power line communication and the in-home-system power line communication coexist as illustrated in FIG. 20, the AV stream is communicated from the in-home PC 401 to a television 405, and the two-way stream is communicated between a friend's house and an in-home IP telephone 406 via the Internet. In this case, according to the technology of Patent Document 1, in the data slot 503 of the frame of FIG. 21, a sufficient space for transmission of the two-way stream needs to be allocated for the access system, and a sufficient space for transmission of the AV stream and the two-way stream needs to be allocated for the in-home system. Here, since there is a limitation (a maximum delay of 10 msec) on the two-way stream, a slot having a maximum interval of 10 msec needs to be allocated for both the access system and the in-home system which transmit the two-way stream. To achieve this, the length of the frame of FIG. 21 needs to be 10 msec or less, or a plurality of slots need to be allocated in a manner which avoids an interval of 10 msec or more in the data slot 503 of the frame. However, when the former is achieved, the frame length becomes shorter, so that the transmission efficiency of an AV stream requiring a high data transmission rate decreases. In this case, even when a two-way stream is not present, the transmission efficiency of the system cannot be increased. Also, when an attempt is made to use the latter to satisfy the QoS requirement of a two-way stream, the amount of information to be transmitted in the control slot 502 increases.

As described above, it is difficult to simultaneously achieve a high data rate and a small delay time in the case of coexistence due to TDM.

A coexistence control employing FDM is preferable in terms of satisfaction of different QoS requirements of a plurality of types of data streams. If FDM is used, each data stream can occupy a specific frequency band, and therefore, a frame can be transmitted at any arbitrary time using an allocated frequency.

When systems having communication schemes different from each other are caused to coexist using FDM, it is difficult to perform a complicated control in a coexistence mechanism which cannot use a limited band. This is because, although coexistence of systems having communication schemes different from each other requires a signal common to all the systems, it is not possible to allocate a large amount of frequencies or time to the common signal, in terms of data communication efficiency. Therefore, a method is generally adopted in which fixed frequency channels are prepared and systems use the respective channels.

Here, a frequency used by an access communication system varies among the set price zones of services, the scales of systems, or target services. Therefore, when an access communication system and an in-home communication system coexist due to FDM, a maximum frequency band for the access communication system needs to be secured in the case of fixed frequency allocation, taking into consideration the case where the access communication system is a system which requires a broad frequency band. Actually, free space occurs in the frequency band secured by the access communication system, or the like, i.e., there is a possibility that frequency efficiency is deteriorated. On the other hand, in the in-home communication system, it is desirable to use as large a number of bands as possible in order to improve or maintain quality, however, in the case of fixed frequency allocation, a free frequency band of the access communication system cannot be utilized.

SUMMARY OF THE INVENTION

Therefore, an object of the present invention is to provide a communication apparatus capable of flexible FDM frequency allocation using a small amount of signal so as to achieve a communication system which can achieve coexistence of an access communication system and an in-home communication system using a simple method while satisfying different QoS requirements of different types of data streams.

The present invention is directed to, in a system in which a plurality of communication systems given predetermined priorities with respect to a right to use a frequency band coexist on the same communication medium, a communication apparatus belonging to a communication system A having a highest-priority use right. To achieve the object, the communication apparatus of the present invention comprises a coexistence signal generating section for generating a coexistence signal indicating a frequency occupied and used by the communication system A, and a coexistence signal transmitting section for transmitting the coexistence signal to another communication system.

Preferably, the frequency band is divided into first to N-th subchannels, and the coexistence signal generating section generates a coexistence signal indicating that the first subchannel to an R-th subchannel ($1 \leq R \leq N$), or an S-th subchannel to the N-th subchannel ($1 \leq S \leq N$), are occupied and used. Here, the first to N-th subchannels all may have the same frequency width. The first to N-th subchannels may be divided into one or more subchannels which can be used by both the communication system A and the other communication system, and one or more subchannels which can be used only by the other communication system. The number of the subchannels which can be used only by the other communication system may be one. Desirably, ½ of the frequency band is allocated for the subchannels which can be used by both the communication system A and the other communication system.

Preferably, a period for data communication is divided into a plurality of time slots, and the coexistence signal generating section generates a coexistence signal having a matrix structure in which a subchannel and a time slot which are used are simultaneously specified. Alternatively, preferably, the coexistence signal generating section generates a coexistence signal composed of one bit for specifying which of a first subchannel side and an N-th subchannel side is used, and a plurality of bits for specifying the number of subchannels which are used, from the first or N-th subchannel as a base point. Preferably, the communication medium used by the communication system A is a power line or a wireless medium. The communication system A may be a system used as an access system, and the other communication system may be a system used as an in-home system.

The present invention is also directed to, in a system in which a plurality of communication systems given predetermined priorities with respect to a right to use a frequency band coexist on the same communication medium, a communication apparatus belonging to a communication system B having a use right other than a highest-priority use right. To achieve the object, the communication apparatus of the present invention comprises a coexistence signal receiving section for receiving a coexistence signal indicating a frequency occupied and used by a communication system A having the highest-priority use right, from the communication system A, a coexistence signal generating section for determining a frequency to be occupied and used by the communication system B other than the frequency indicated by the coexistence signal, and generating a second coexistence signal indicating the determined frequency, and a coexistence signal transmitting section for transmitting the second coexistence signal to another communication system.

Preferably, the frequency band is divided into first to N-th subchannels, and the coexistence signal receiving section receives a coexistence signal indicating that frequencies of the first subchannel to an R-th subchannel ($1 \leq R \leq N$), or frequencies of an S-th subchannel to the N-th subchannel ($1 \leq R \leq N$), are occupied and used, from the communication system A. Here, the first to N-th subchannels all may have the same frequency width. The first to N-th subchannels may be divided into one or more subchannels which can be used by both the communication system A and the other communication system, and one or more subchannels which can be used only by the other communication system. The number of the subchannels which can be used only by the other communication system may be one. Desirably, ½ of the frequency band is allocated for the subchannels which can be used by both the communication system A and the other communication system.

Preferably, a period for data communication is divided into a plurality of time slots, the coexistence signal receiving section receives a second coexistence signal having a matrix structure in which a subchannel and a time slot which are used are simultaneously specified, and the coexistence signal generating section determines a frequency to be occupied and used by the communication system B other than the frequency indicated by the coexistence signal, and generates a second coexistence signal indicating the determined frequency using a matrix structure. Alternatively, preferably, the coexistence signal generating section generates a second coexistence signal composed of one bit for specifying which of a first subchannel side and an N-th subchannel side is used, and a plurality of bits for specifying the number of subchannels which are used, from the first or N-th subchannel as a base point. Preferably, the communication medium used by the communication system B is a power line or a wireless medium. The communication system B may be a system used as an access system, and the other communication system may be a system used as an in-home system.

According to the present invention, an access communication system and an in-home communication system can be caused to coexist on the same communication medium using a simple control signal (coexistence signal). Particularly, since a coexistence signal employing both time division and frequency division, a QoS control and a coexistence control can be performed using a signal having a small number of bits.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram illustrating an exemplary definition table used in the first embodiment;

FIG. 7 is a specific exemplary setting of the coexistence signal of FIG. 4A;

FIG. 11 is a diagram illustrating a detailed example of a coexistence signal used in the second embodiment;

FIGS. 12A to 12C are diagrams illustrating exemplary definition tables used in the second embodiment;

FIG. 14 is a diagram illustrating an exemplary division of a frequency band which can be used by each of communication systems A to C into subchannels;

FIG. 15 is a diagram illustrating a detailed example of a coexistence signal used in the third embodiment;

FIG. 16 is a diagram illustrating an exemplary definition table of the third embodiment;

FIGS. 21 and 22 are diagrams illustrating exemplary frame structures in the conventional art; and FIG. 23 is a diagram illustrating a data stream transmitted on a communication medium.

DESCRIPTION OF THE PREFERRED EMBODIMENTS

Hereinafter, a coexistence control of the present invention will be described, illustrating, as an example, the case where it is applied to a power line communication system in which a power line is used as a communication medium.

(First Embodiment)

Figure 1:
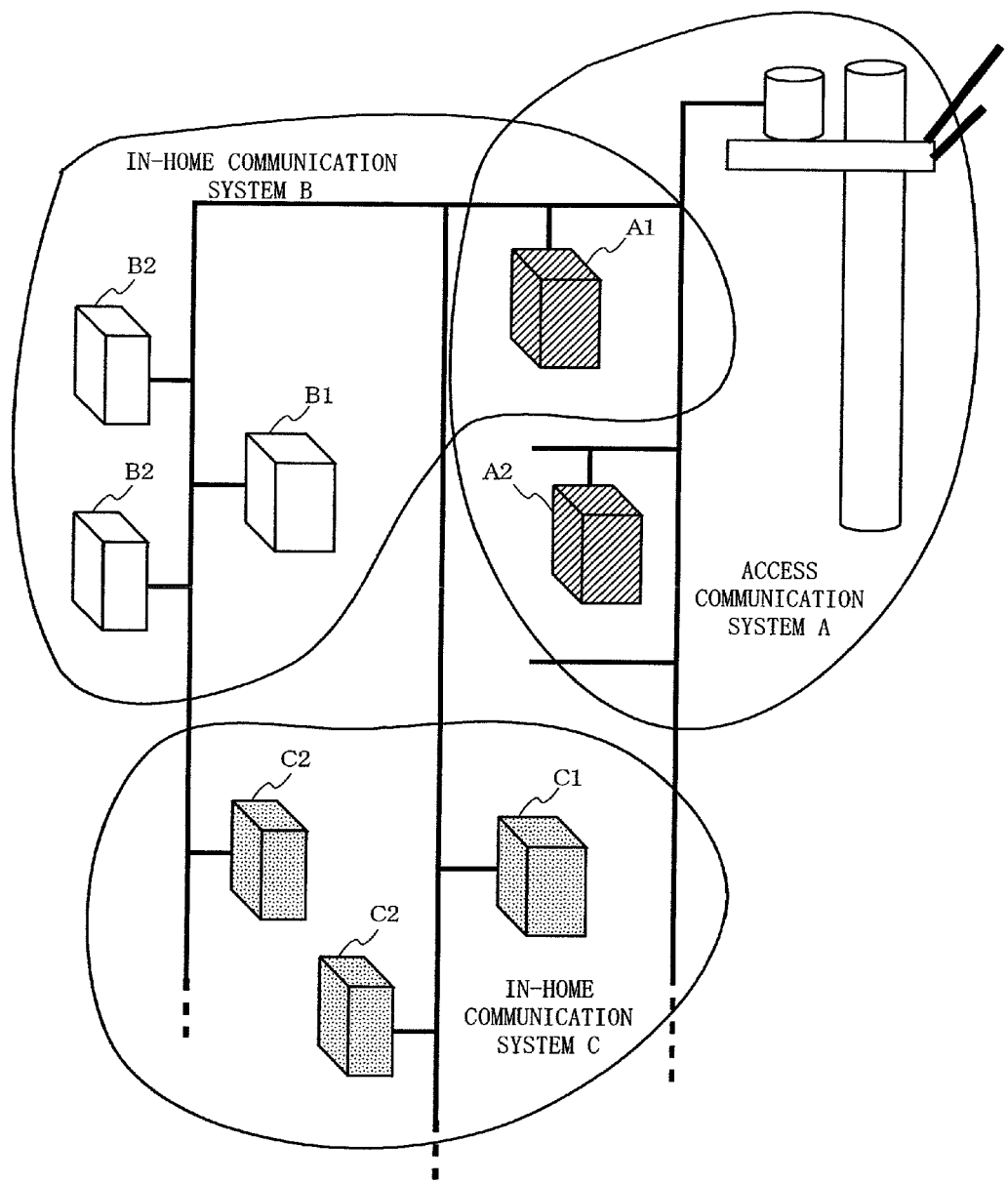
FIG. 1 is a diagram illustrating an exemplary configuration of a power line communication system according to a first embodiment of the present invention.

FIG. 1 is a diagram illustrating an exemplary configuration of a power line communication system according to a first embodiment of the present invention. FIG. 1 illustrates an example where an access communication system A and in-home communication systems B and C are defined. The access communication system A is a power line communication system (e.g., public communication, etc.) which is given a high priority with respect to use of a frequency band, and which utilizes a power line provided in a home, a low-voltage power distribution line extending from a home to a pole transformer on a utility pole, and an intermediate-voltage power distribution line from a pole transformer to an electric power substation. The in-home communication systems B and C are each a power line communication system (e.g., in-home communication, etc.) which is given a relatively low priority with respect to use of a frequency band, and utilizes a power line provided in a home.

The access communication system A is composed of a communication apparatus for performing a coexistence control with respect to the other communication systems B and C using the same power line (hereinafter referred to as an access-system controller A1), and a communication apparatus provided in each home (hereinafter referred to as an access-system in-home apparatus A2). The in-home communication system B is composed of a communication apparatus for performing a coexistence control with respect to the other communication systems A and C using the same power line (hereinafter referred to as an in-home-system controller B1), and one or more communication apparatuses which are operated under a control of the in-home-system controller B1 (hereinafter referred to as in-home-system slaves B2). The in-home communication system C is composed of a communication apparatus for performing a coexistence control with respect to the other communication systems A and B using the same power line (hereinafter referred to as an in-home-system controller C1), and one or more communication apparatuses which are operated under a control of the in-home-system controller C1 (hereinafter referred to as in-home-system slaves C2).

Hereinafter, a method for coexistence of the access communication system A and the in-home communication systems B and C in the power line communication system of FIG. 1 without interference with communication therebetween, will be described. Note that, in the first embodiment, priorities with which a frequency band is used are predetermined in order of the access communication system A>the in-home communication system B>the in-home communication system C. In other words, the access communication system A, the in-home communication system B, and the in-home communication system C have a right to use a frequency band with priorities in that order. It is also assumed that, in each of the communication systems A to C, a frequency band of 2 MHz to 30 MHz can be used. Note that the frequency band which can be used by each of the communication systems A to C is not limited to 2 MHz to 30 MHz, and the communication systems A to C do not need to use the same frequency band.

Figure 2:
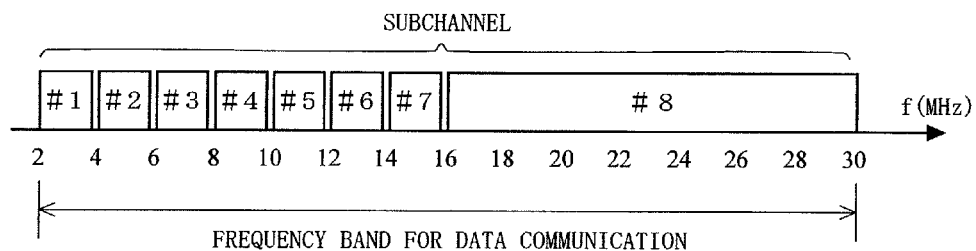
FIG. 2 is a diagram illustrating an exemplary division of a frequency band which can be used by each of communication systems A to C into subchannels.

FIG. 2 is a diagram illustrating an exemplary division of the frequency band which can be used by each of the communication systems A to C into subchannels. In the example of FIG. 2, 2 MHz to 16 MHz is divided into units of 2 MHz, i.e., seven subchannels #1 to #7, and 16 MHz to 30 MHz is a subchannel #8. The subchannels #1 to #7 can be used by each of the communication systems A to C for data communication. The subchannel #8 can be used only by the in-home communication systems B and C. Note that the number of subchannels and the bandwidth of each subchannel are not limited to those illustrated in FIG. 2 and can be arbitrarily set.

Figure 3:
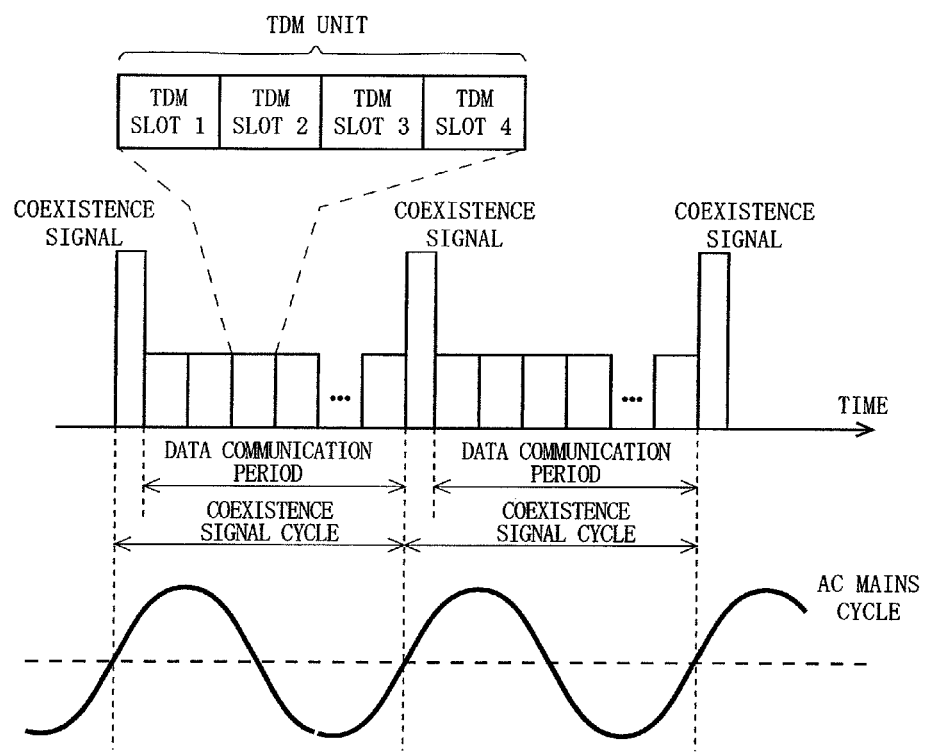
FIG. 3 is a diagram illustrating how a coexistence signal and a communication signal of each of the communication systems B and C are transmitted and received in a time-division manner.

FIG. 3 is a diagram illustrating how a coexistence signal and a communication signal of each of the communication systems B and C are transmitted and received in a time-division manner. The coexistence signal is sent out with timing which is in synchronization with zero-crossing points of an AC mains (described in detail below), and an interval between each coexistence signal is a data communication period. In addition, in the first embodiment, an example will be described in which the data communication period is divided into a plurality of TDM units, and the TDM unit is divided into four TDM slots 1 to 4. This is configured in view of data communication which it is important to perform in real time. The number of TDM slots and the length of each TDM slot are not limited to those of this example and can be arbitrarily designed.

Figure 4:
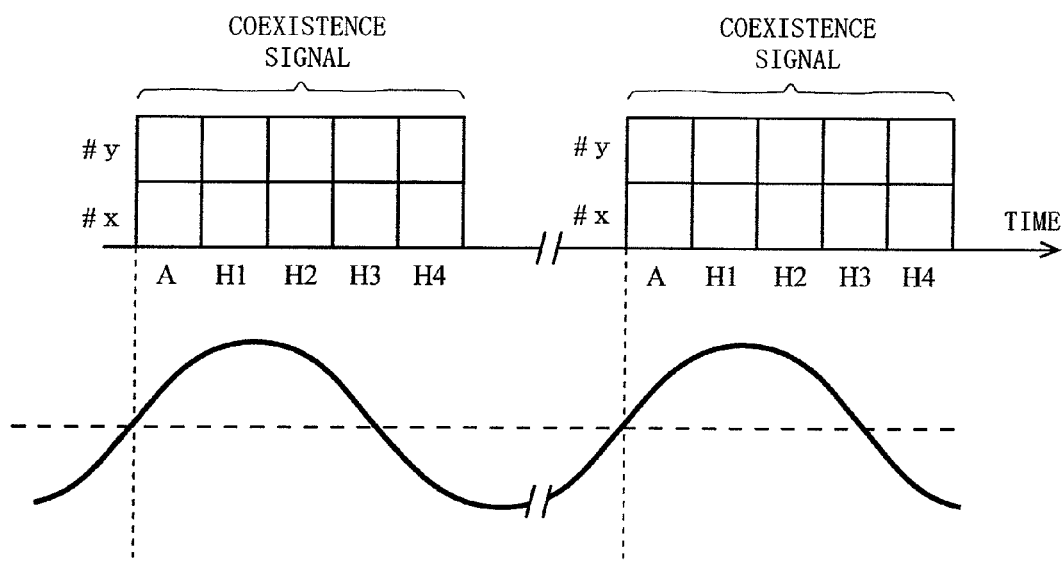
FIGS. 4A and 4B are diagrams illustrating detailed examples of the coexistence signal used in the first embodiment.
Figure 5:
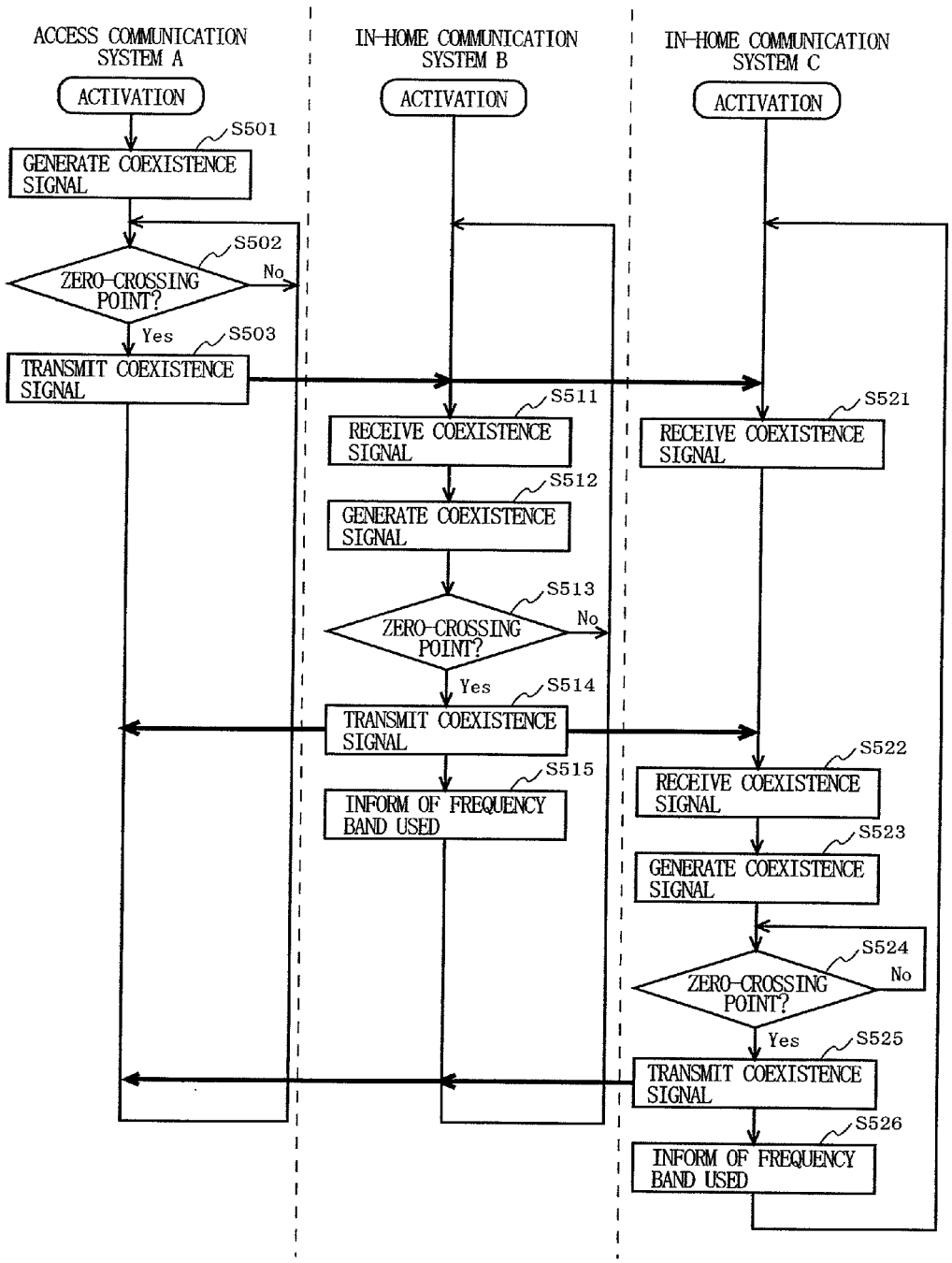
FIG. 5 is a flowchart for explaining a process in which the communication systems A to C coexist.

A process in which the subchannels #1 to #8 and the TDM slots 1 to 4 are shared and used (frequency division and time division) so that the communication systems A to C coexist, will be hereinafter described with reference to FIGS. 4A, 4B and 5. FIGS. 4A and 4B are diagrams illustrating detailed examples of the coexistence signal of FIG. 3. FIG. 5 is a flowchart for explaining the process in which the communication systems A to C coexist.

A coexistence signal of FIG. 4A has a time-frequency matrix structure composed of five time slots (i.e., a slot A and slots H1 to H4) and two frequency channels (i.e., channels #x and #y). The slot A is used to inform the presence of the access communication system A. The slots H1 to H4 are used to declare subchannels used by the in-home communication system B, and correspond to the TDM slots 1 to 4, respectively. The channel #x corresponds to the subchannels #1 to #7, and the channel #y corresponds to the subchannel #8. The time-frequency matrix structure can be arbitrarily set, depending on the number of divided channels and the number of divided slots. The time-axis parameter may be a TDM unit instead of a TDM slot.

Initially, in the access communication system A, the access-system controller A1 generates a coexistence signal in which bit "1" is set at a position of the time-frequency matrix corresponding to subchannels occupied by itself (step S501). For example, when the subchannels #1 to #7 are used, a coexistence signal in which bit "1" is set at a position of the slot A and the channel #x, is generated. The access communication system A detects zero-crossing points of an AC mains (step S502), and sends out the generated coexistence signal with the detected timing onto a power line (step S503).

The zero-crossing point refers to a point at which an alternating current has a phase of 0 or 180 degrees and which is cyclically repeated, depending on an AC mains frequency (50 Hz or 60 Hz). Note that a point which is deviated by a predetermined amount of phase from a zero-crossing point may be used if it can be used as a reference for transmission timing. The coexistence signal does not need to be issued at all zero-crossing points or all points deviated by a predetermined amount of phase from zero-crossing points. For example, a coexistence signal may be issued every six zero-crossing points. The transmission timing units of the coexistence signal may be times obtained by equally dividing an interval between adjacent zero-crossing points where zero-crossing points or points deviated by a predetermined amount of phase from zero-crossing points are used as references. Specifically, the issuance interval of the coexistence signal may be a time corresponding to a phase of 60 degrees of an alternating current flowing through a power line, or an integral multiple of the time, where zero-crossing points or points deviated by a predetermined amount of phase from zero-crossing points are used as references.

Next, in the in-home communication system B, the in-home-system controller B1 receives the coexistence signal sent out by the access communication system A (step S511). Thereafter, the in-home communication system B confirms a free subcarrier based on the received coexistence signal, and generates a coexistence signal in which bit "1" is set at a position of the time-frequency matrix corresponding to a subchannel occupied by itself in the free subcarrier (step S512). For example, when the subchannel #8 is used and the slots H1 and H2 are used, a coexistence signal in which bit "1" is set at positions of the slots H1 and H2 and the channel #y, is generated. The in-home communication system B detects zero-crossing points having an AC mains cycle (step S513), and sends out the generated coexistence signal with the detected timing onto a power line (step S514). The in-home-system slave B2 is informed of information about the occupied subchannel set in the coexistence signal (step S515).

The in-home communication system C receives the coexistence signal from each of the access communication system A and the in-home communication system B (step S521 and S522). Thereafter, the in-home communication system C confirms a free subcarrier based on the received coexistence signal, and generates a coexistence signal in which bit "1" is set at a position of the time-frequency matrix corresponding to a subchannel occupied by itself in the free subcarrier (step S523). For example, when the subchannel #8 is used and the slots H4 is used, a coexistence signal in which bit "1" is set at a position of the slot H4 and the channel #y, is generated. The in-home communication system C detects zero-crossing points having an AC mains cycle (step S524), and sends out the generated coexistence signal with the detected timing onto a power line (step S525). The in-home-system slave C2 is informed of information about the occupied subchannel set in the coexistence signal (step S526).

By the above-described process, the communication systems A to C can share a frequency band without overlapping or collision. The coexistence signal to which the above-described example is applied has information about the time-frequency matrix of FIG. 4B. Although, in FIG. 5, the in-home communication system B and C detects a zero-crossing point and transmits a coexistence signal after receiving a coexistence signal from another system, the in-home communication system B and C may detect a zero-crossing point before trying to receive a coexistence signal.

In the above-described method of setting a coexistence signal, the time slots of the subchannels occupied by the access communication system A, i.e., the slots H1 to H4 of the channel #x, are unused. Therefore, a method of using the unused bits to inform the in-home communication system B and C of a frequency band actually used by the access communication system A, in more detail, will be described.

In this method, for example, a definition table is previously prepared as illustrated in FIG. 6. In the definition table, bit values of the slots H1, H2, H3 and H4 are associated with frequency bands which are used. For example, if the upper limit of frequency bands which are actually used by the access communication system A is 12 MHz (the subchannels #1 to #5), bits 1, 1, 0 and 0 are set in the time slots H1, H2, H3 and H4, respectively.

This bit information can be used to inform of the frequency bands actually used by the access communication system A. Therefore, the in-home communication system B and C examines the information, and can use a frequency band which is not actually used, thereby making it possible to achieve coexistence with high communication efficiency. In the above-described example, such a frequency band is 12 MHz to 16 MHz (the subchannels #6 to #7). In addition, even if the in-home communication system B and C cannot receive signals issued in the time slots H1 to H4 by the access communication system A, only the channel #8 is used, so that signals of the other communication systems are not interfered with. Note that the coexistence signal to which this example is applied has information about the time-frequency matrix of FIG. 7.

Next, configurations of the access-system controller A1 and the in-home-system controllers B1 and C1 will be described.

Figure 8:
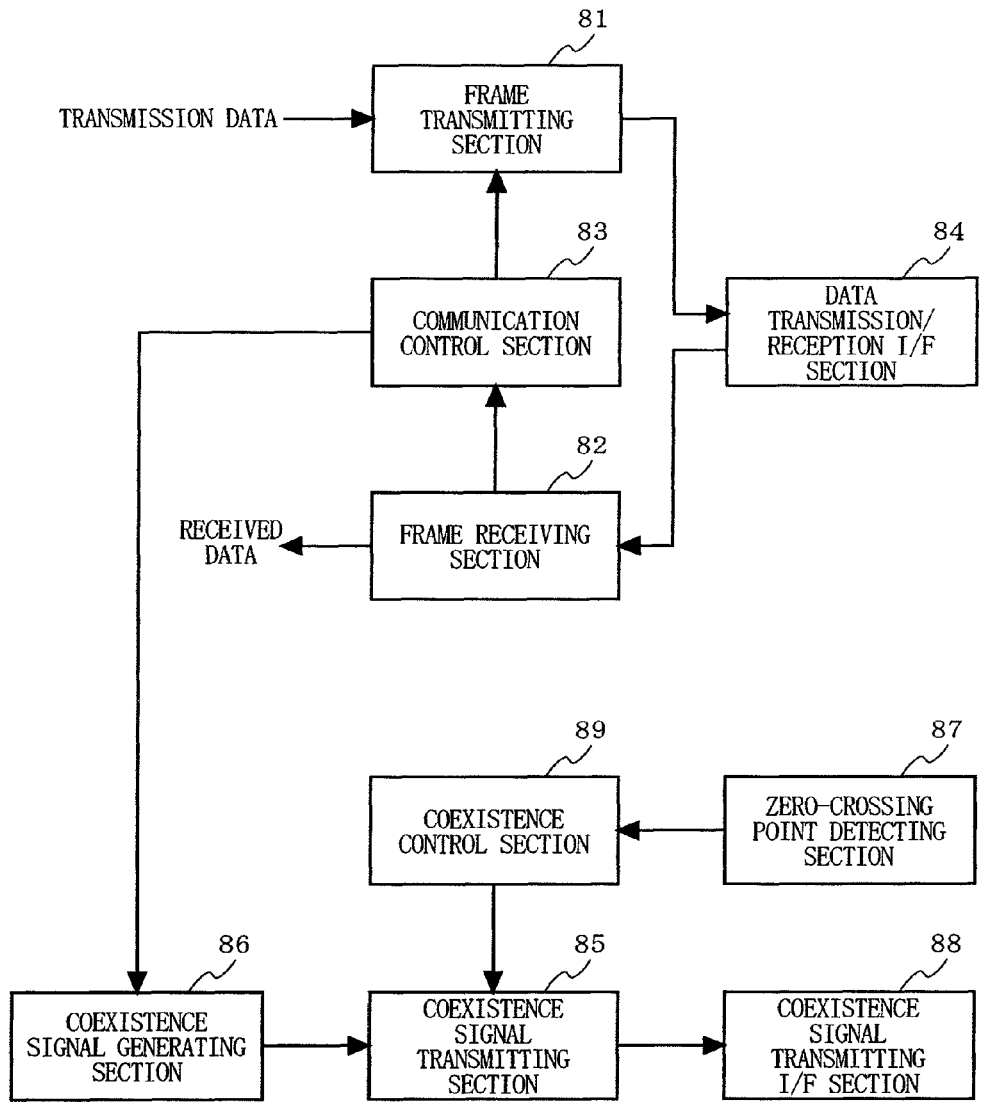
FIG. 8 is a diagram illustrating an exemplary configuration of an access-system controller A1 of FIG. 1.

FIG. 8 is a diagram illustrating an exemplary configuration of the access-system controller A1. The access-system controller A1 of FIG. 8 roughly comprises a frame transmitting section 81, a frame receiving section 82, a communication control section 83 and a data transmission/reception I/F section 84 which are configured to perform data communication, and a coexistence signal transmitting section 85, a coexistence signal generating section 86, a zero-crossing point detecting section 87, a coexistence signal transmission I/F section 88 and a coexistence control section 89 which are configured to perform a coexistence control.

The frame receiving section 82 subjects a transmission frame received by the data transmission/reception I/F section 84 to a required process, to generate received data. The frame transmitting section 81 frames transmission data to be communicated in the access communication system A, and transmits the frame data via the data transmission/reception I/F section 84. The communication control section 83 references information from the frame receiving section 82, and informs the frame transmitting section 81 of data transmission timing and outputs information about a subchannel used by the access communication system A to the coexistence signal generating section 86. Based on the information, the coexistence signal generating section 86 creates a coexistence signal including information about the subchannel used by the access communication system A. The zero-crossing point detecting section 87 detects a zero-crossing point of an alternating current flowing through a power line. The coexistence control section 89 informs the coexistence signal transmitting section 85 of timing of the detected zero-crossing point. The coexistence signal transmitting section 85 transmits the coexistence signal via the coexistence signal transmission I/F section 88 with the timing informed of by the coexistence control section 89.

Figure 9A:
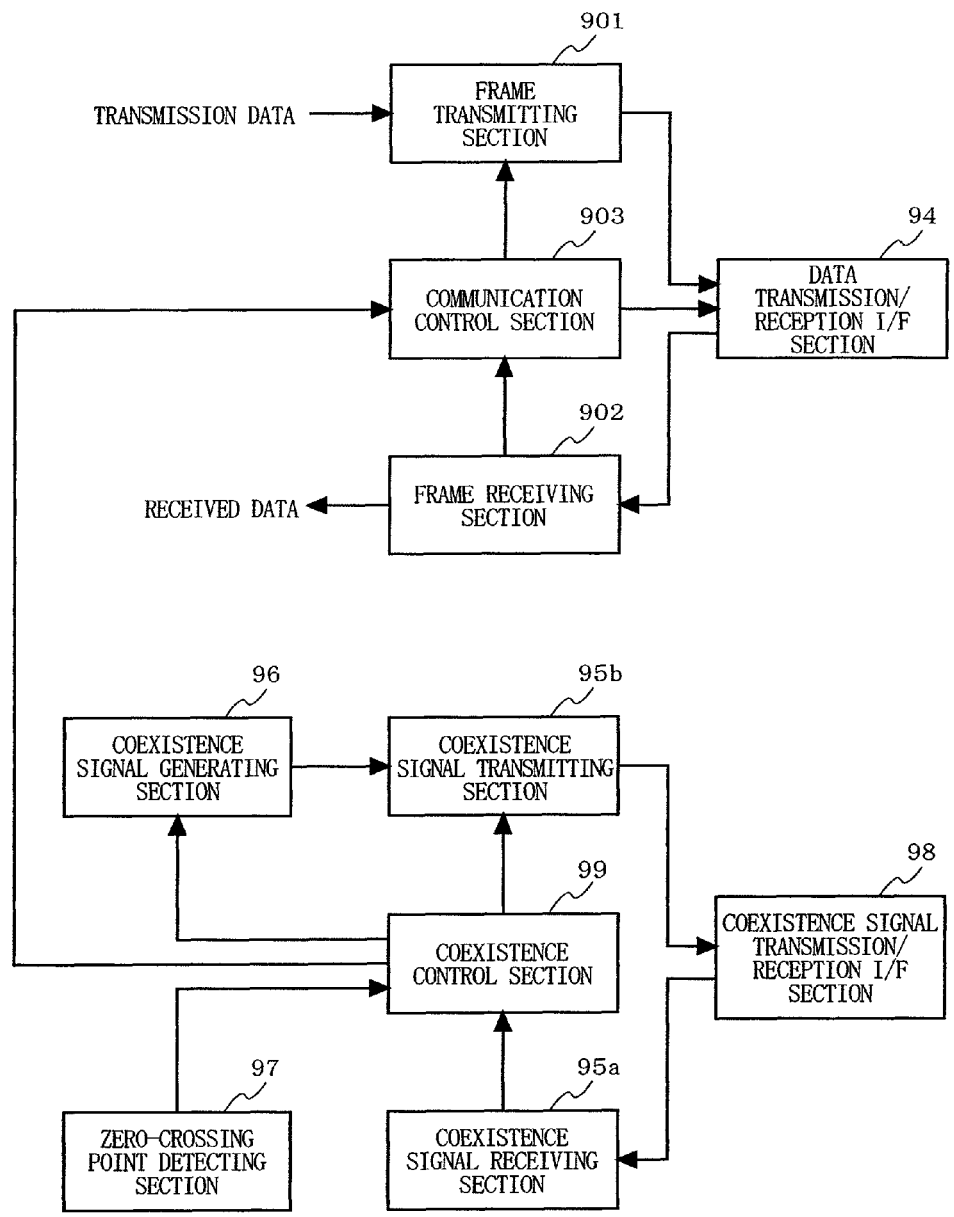
FIGS. 9A to 9C are diagrams illustrating exemplary configurations of in-home-system controllers B1 and C1 of FIG. 1.

FIG. 9A is a diagram illustrating an exemplary configuration of the in-home-system controllers B1 and C1. The in-home-system controllers B1 and C1 of FIG. 9A each roughly comprise a frame transmitting section 91, a frame receiving section 92, a communication control section 93 and a data transmission/reception I/F section 94 which are configured to perform data communication, and a coexistence signal receiving section 95a, a coexistence signal transmitting section 95b, a coexistence signal generating section 96, a coexistence signal receiving section 97, a zero-crossing point detecting section 97, a coexistence signal transmission/reception I/F section 98 and a coexistence control section 99 which are configured to perform a coexistence control.

The frame receiving section 92 subjects a transmission frame received by the data transmission/reception I/F section 94 to a required process, to generate received data. The frame transmitting section 91 frames transmission data to be communicated in the in-home communication system B or C, and transmits the frame data via the data transmission/reception I/F section 94. The communication control section 93 references information from the frame receiving section 92, and informs the frame transmitting section 91 of data transmission timing and obtains information about a subchannel used by the in-home communication system B or C from the coexistence control section 99. The coexistence signal receiving section 95a analyzes a coexistence signal received via the coexistence signal transmission/reception I/F section 98, to obtain information about a subchannel to be used by the in-home communication system B or C. The coexistence control section 99 informs the communication control section 93 and the coexistence signal generating section 96 of the information about a subchannel to be used by the in-home communication system B or C. Based on the information, the coexistence signal generating section 96 creates a coexistence signal containing information about a subchannel used by the in-home communication system B or C. The zero-crossing point detecting section 97 detects a zero-crossing point of an alternating current flowing through a power line. The coexistence control section 99 informs the coexistence signal transmitting section 95b of timing of the detected zero-crossing point. The coexistence signal transmitting section 95b transmits the coexistence signal via the coexistence signal transmission/reception I/F section 98 with the timing informed of by the coexistence control section 99.

Figure 9B:
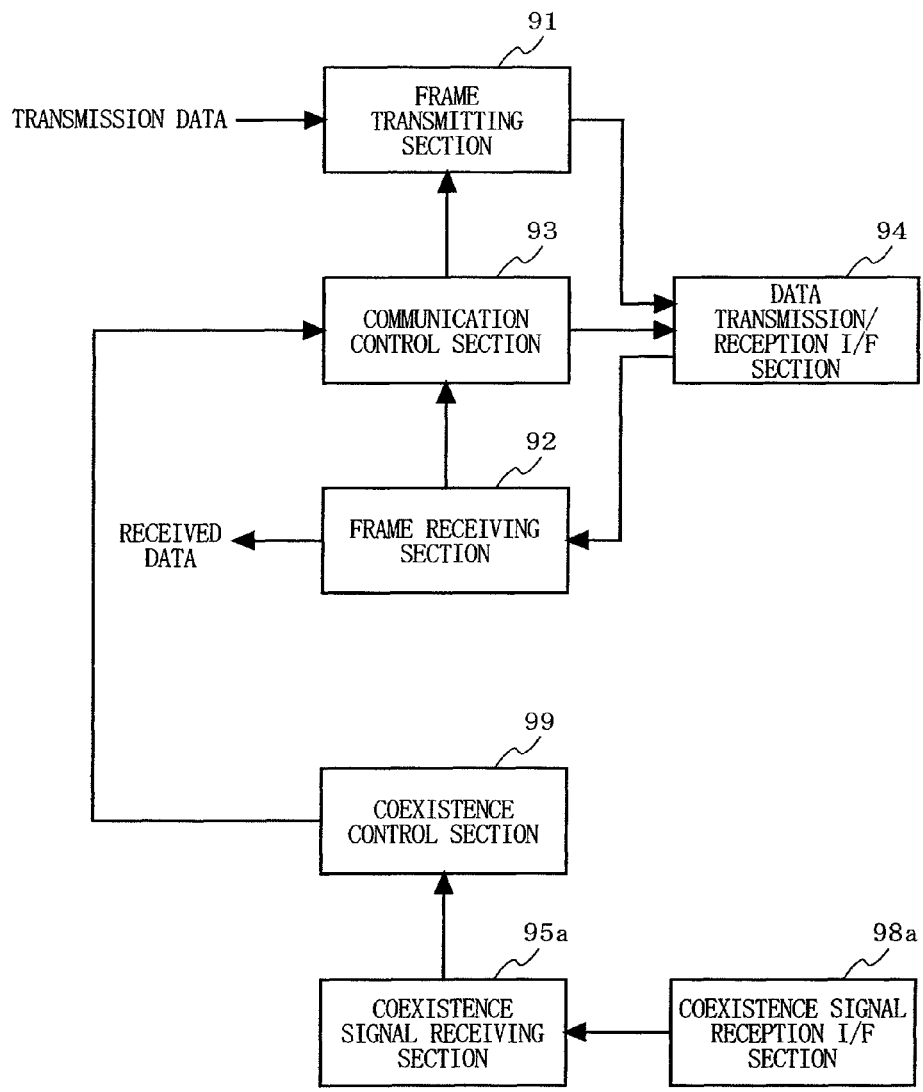
Figure 9C:
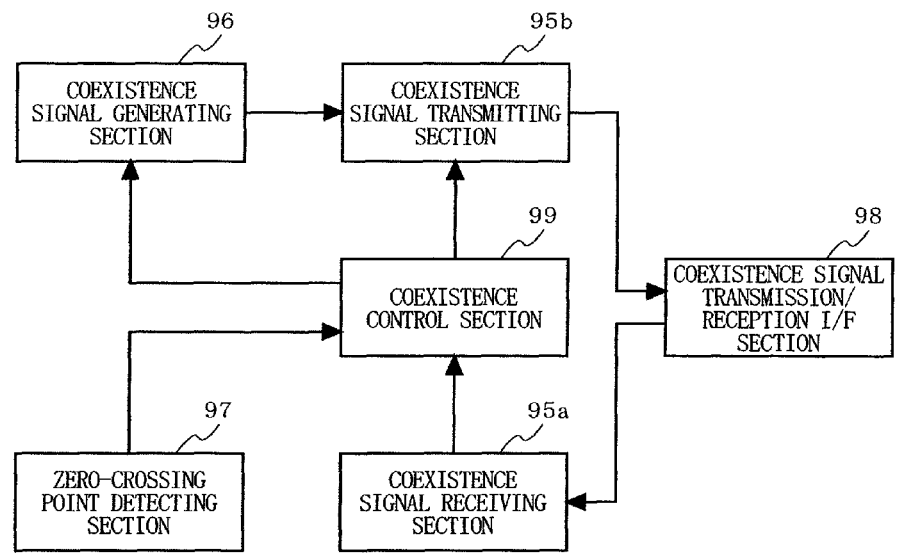

Note that, when it is not necessary to transmit a coexistence signal to other communication systems (e.g., a communication system has a lowest priority), the in-home-system controllers B1 and C1 may have a configuration illustrated in FIG. 9B in which the function of transmitting a coexistence signal is removed. Also, when only a control of a coexistence signal is performed and data communication is not performed between the in-home-system controllers B1 and C1 and slaves in their systems, the parts for performing data communication may be removed (FIG. 9C).

As described above, according to the first embodiment of the present invention, an access communication system and an in-home communication system can be caused to coexist on the same communication medium using a simple control signal (coexistence signal). Particularly, since a coexistence signal which employs both time division and frequency division is used, a QoS control and a coexistence control can be performed using a signal having a small number of bits.

Note that the in-home-system controllers B1 and C1 may be fixedly specified or may be dynamically specified during an operation. Also, a plurality of the in-home-system controllers B1 or C1 may be present in one in-home communication system if transmission of coexistence signals can be synchronized.

The access-system controller A1 may be incorporated into the access-system in-home apparatus A2, a pole transformer or the like. Alternatively, the access-system in-home apparatus A2 may be provided on a low-voltage power distribution line outside a home, and the access-system in-home apparatus A2 may be imparted with a communication function of an in-home communication system.

The in-home-system controllers B1 and C1 are actually connected with the access-system in-home apparatus A2 via communication means, such as an Ethernet or the like. Alternatively, by providing the in-home-system controller B1 or C1 and the access-system in-home apparatus A2 as a single apparatus, communication is achieved between the in-home-system controller B1 and the access-system in-home apparatus A2, and between the in-home-system controller C1 and the access-system in-home apparatus A2.

In the above-described embodiment, it has been described that a controller is distinguished from a slave. Alternatively, for example, if all slaves have a function of handling a coexistence signal, it is not necessary to distinguish a controller from a slave. Also, the number of coexisting in-home communication systems may be three or more. When three or more in-home communication systems are caused to coexist, priority is given to one of them, and communication is performed between in-home communication systems which are not given priority, taking signal collision into consideration.

(Second Embodiment)

In the first embodiment, the case where a coexistence signal having a time-frequency matrix structure has been described. In a second embodiment, the case where a coexistence signal having a slightly simpler time matrix structure is used, will be described. Note that an exemplary configuration of a power line communication system according to the second embodiment is the same as that of FIG. 1 and will not be described.

Figure 10:
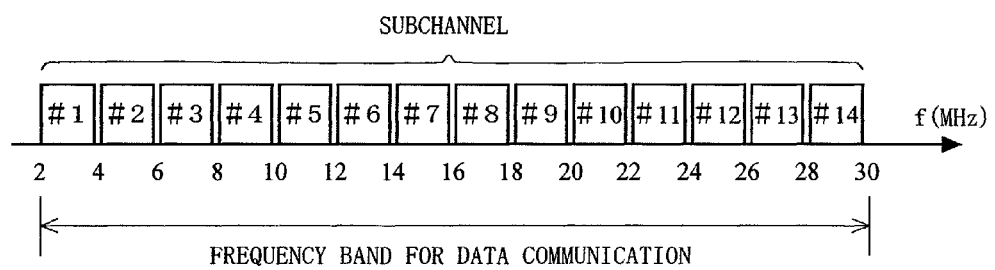
FIG. 10 is a diagram illustrating an exemplary division of a frequency band which can be used in each of communication systems A to C used in a second embodiment, into subchannels.

FIG. 10 is a diagram illustrating an exemplary division of a frequency band which can be used in each of the communication systems A to C into subchannels. In the example of FIG. 10, 2 MHz to 30 MHz is divided into units of 2 MHz, i.e., fourteen subchannels #1 to #14. The subchannels #1 to #14 can be used by each of the communication systems A to C for data communication. Note that the division into subchannels is not limited to that of FIG. 10, and can be arbitrarily set. Note that a coexistence signal, and a communication signal of each of the communication systems B and C are transmitted and received in a time division manner as in FIG. 3.

In the second embodiment, as illustrated in FIG. 11, a coexistence signal composed of a plurality of time slots A1 to A3 and H1 to H3 is used. In the example of FIG. 11, a maximum of six bits of information can be transmitted. The slots A1 to A3 are used to declare subchannels used by the access communication system A. The slots H1 to H3 are used to declare subchannels used by the in-home communication system B. The number of slots is not limited to six and can be arbitrarily set. In addition, in the second embodiment, a definition table for the slots A1 to A3 (FIG. 12A) and definition tables for the slots H1 to H3 (FIGS. 12B and 12C) are previously prepared. Regarding the definition tables, the number of tables and relevance therebetween can be arbitrarily set.

The access communication system A generates a coexistence signal in which bit "1" is set to the slots A1 to A3 corresponding to subchannels occupied by itself, based on the definition table. For example, when the subchannels #1 to #4 are used, the bits of the slots A1, A2 and A3 are set to be 0, 1 and 1, respectively, by referencing the definition table of FIG. 12A. Note that, when the access communication system A is not present, {A1, A2, A3=0, 0, 0} is set as a default setting.

The in-home communication system B confirms a coexistence signal received from the access communication system A, and based on the definition table, generates a coexistence signal in which bit "1" is set to the slots H1 to H3 corresponding to subchannels occupied by itself from subchannels which are not used by the access communication system A. For example, when the subchannel #11 to #14 (four channels from the highest frequency) are used, the bits of the slots H1, H2 and H3 are set to be 1, 1 and 0, respectively, by referencing the definition table of FIG. 12B. Here, when the communication system A is not present, a number of frequency bands can be used, and therefore, the bits of the slots H1, H2 and H3 are set by referencing the definition table of FIG. 12C. Note that, when the in-home communication system B which is to be given priority is not present, {H1, H2, H3=0, 0, 0} is set as a default setting.

The in-home communication system C confirms coexistence signals received from the access communication system A and the in-home communication system B, and determines a subchannel to be occupied by itself among subchannels which are not used by the access communication system A and the in-home communication system B. If neither the access communication system A nor the in-home communication system B is present, the in-home communication system C can use all subchannels.

As described above, according to the second embodiment of the present invention, an access communication system and an in-home communication system can be caused to coexist on the same communication medium using a simple control signal (coexistence signal). Particularly, since a coexistence signal which employs frequency division is used, a QoS control can be easily achieved.

(Third Embodiment)

In the first and second embodiments, a high-performance coexistence control method for the purpose of practical use and high efficiency has been described. In a third embodiment described below, a simpler coexistence control method will be described.

Figure 13:
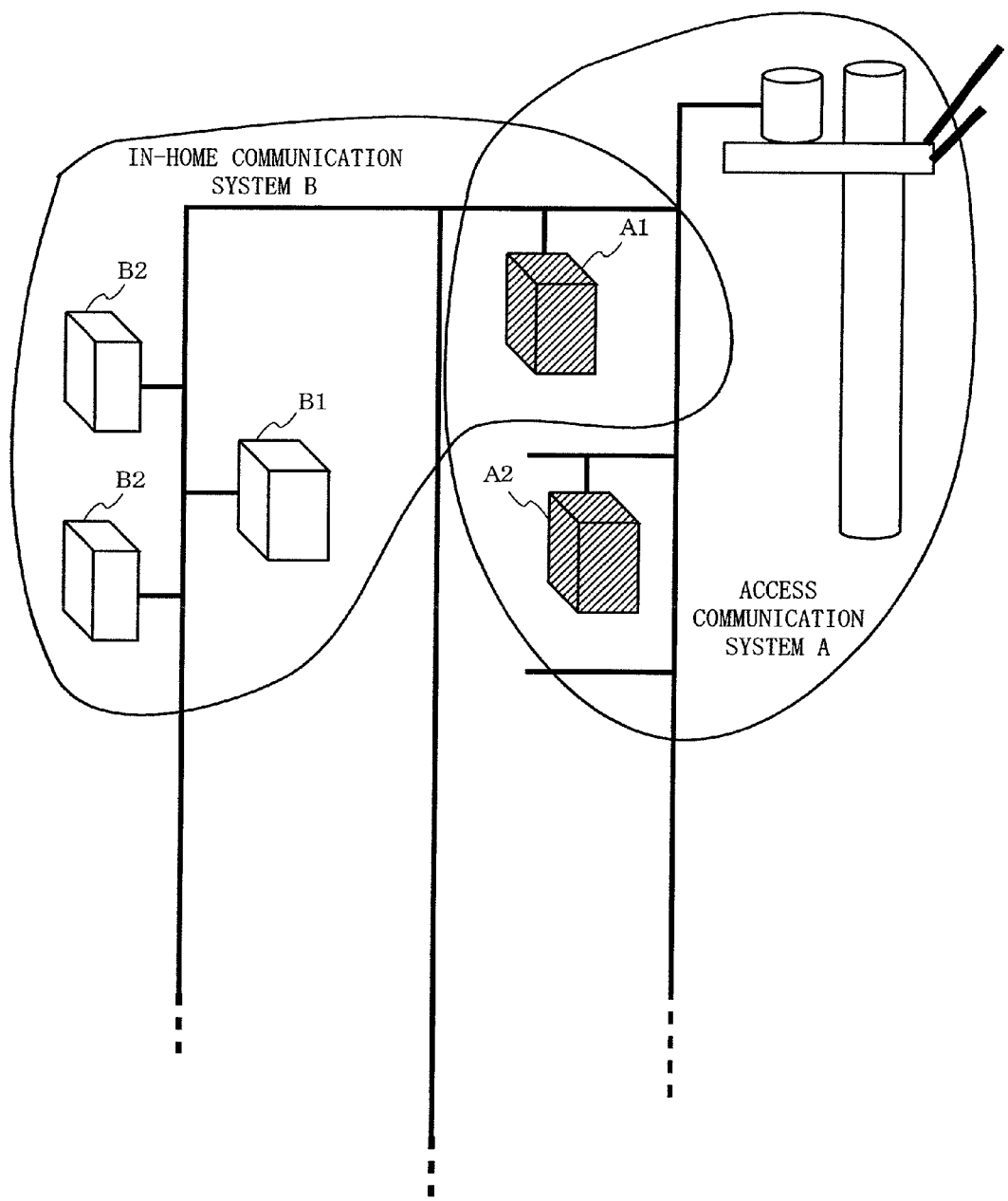
FIG. 13 is a diagram illustrating an exemplary configuration of a power line communication system according to a third embodiment of the present invention.

FIG. 13 is an exemplary configuration of a power line communication system according to a third embodiment of the present invention. FIG. 13 illustrates an example in which only an access communication system A and an in-home communication system B are defined.

FIG. 14 is a diagram illustrating an exemplary division of a frequency band which can be used by each of the communication systems A and B into subchannels. In the example of FIG. 14, 2 MHz to 4 MHz is one coexistence-signal subchannel #0, and 4 MHz to 28 MHz is divided into units of 2 MHz, i.e., twelve subchannels #1 to #12. The subchannel #0 can be used by the access communication system A for transmission of a coexistence signal. The subchannels #1 to #12 can be used by each of the communication systems A and B for data communication. Note that the number of subchannels and the bandwidth of each subchannel are not limited to those illustrated in FIG. 14 and can be arbitrarily set.

In the third embodiment, as illustrated in FIG. 15, a coexistence signal composed of a plurality of time slots A1 to A3 is used. In the example of FIG. 15, a maximum of three bits of information can be transmitted. The slots A1 to A3 are used to declare subchannels used by the access communication system A. The number of slots is not limited to three and can be arbitrarily set. In addition, in the third embodiment, a definition table for the slots A1 to A3 (FIG. 16) is previously prepared. Regarding the definition table, the number of tables and relevance therebetween can be arbitrarily set.

The access communication system A generates a coexistence signal in which bit "1" is set to the slots A1 to A3 corresponding to subchannels occupied by itself, based on the definition table. For example, when the subchannels #1 to #4 are used, the bits of the slots A1, A2 and A3 are set to be 0, 1 and 1, respectively, by referencing the definition table of FIG. 16. Note that, when the access communication system A is not present, {A1, A2, A3=0, 0, 0} is set as a default setting.

The in-home communication system B confirms a coexistence signal received from the access communication system A, and determines a subchannel to be occupied by itself among subchannels which are not used by the access communication system A. If the access communication system A is not present, the in-home communication system B can use all the subchannels.

As described above, according to the third embodiment of the present invention, an access communication system and an in-home communication system can be caused to coexist on the same communication medium using a simple control signal (coexistence signal).

Figure 17:
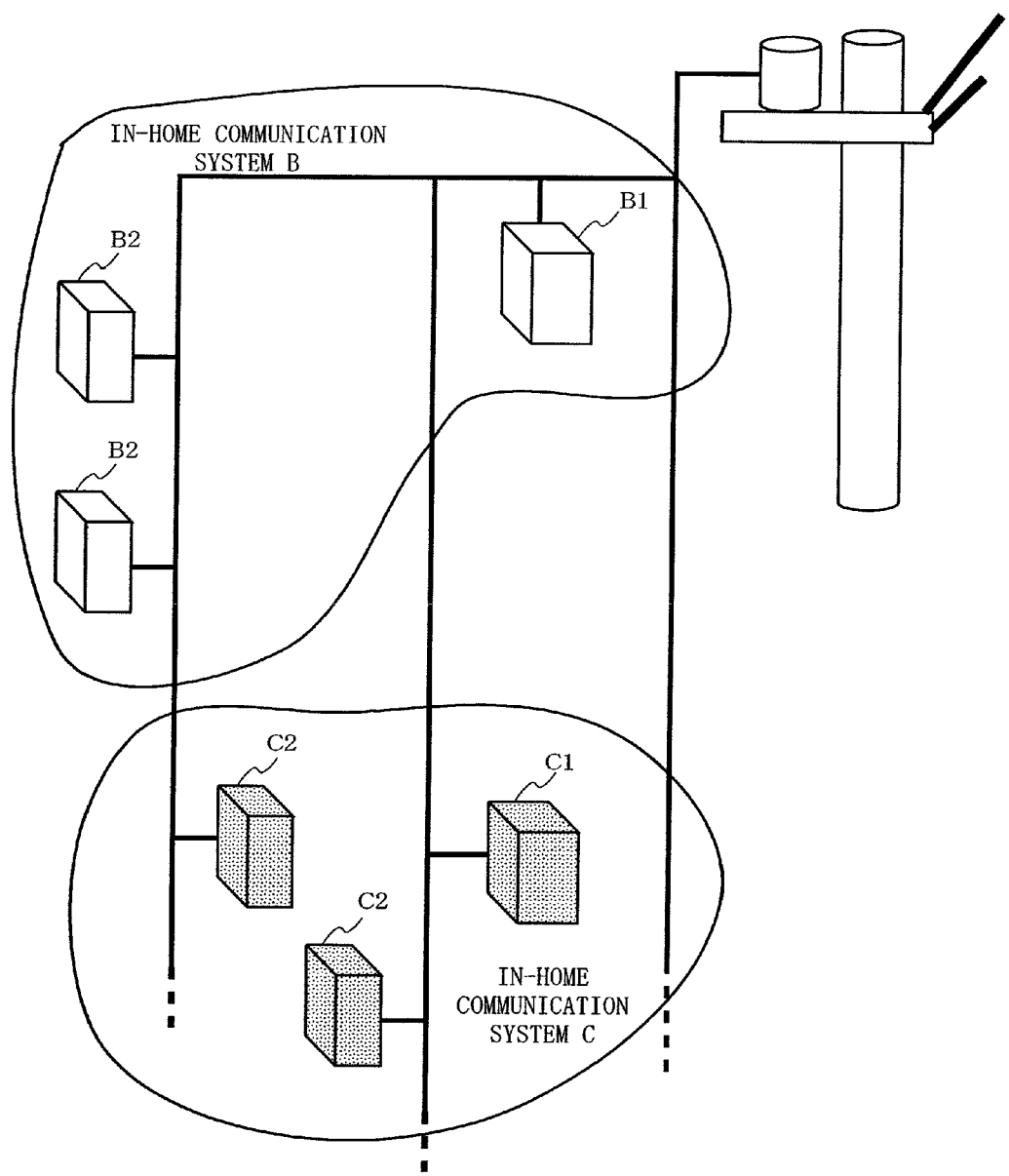
FIG. 17 is a diagram illustrating another exemplary configuration of the power line communication system of the third embodiment of the present invention.
Figure 18:
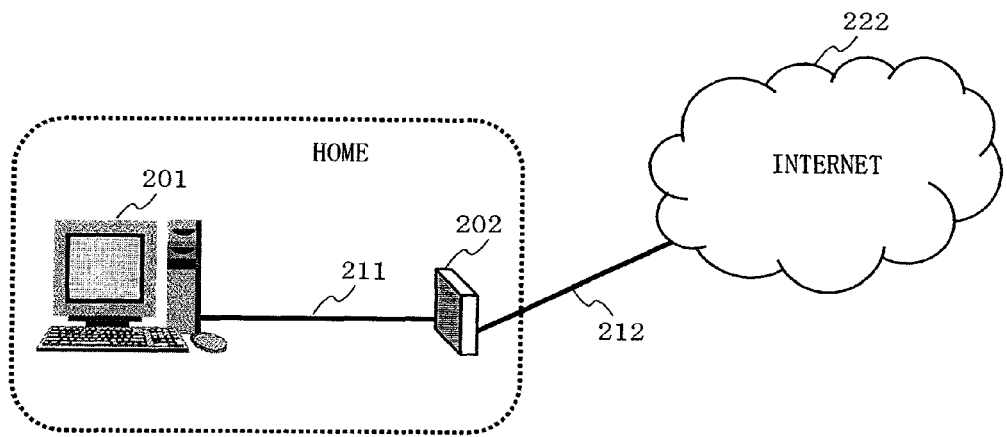
FIGS. 18 to 20 are diagrams illustrating conventional general configurations when a PC is used to access from home to the Internet.
Figure 19:
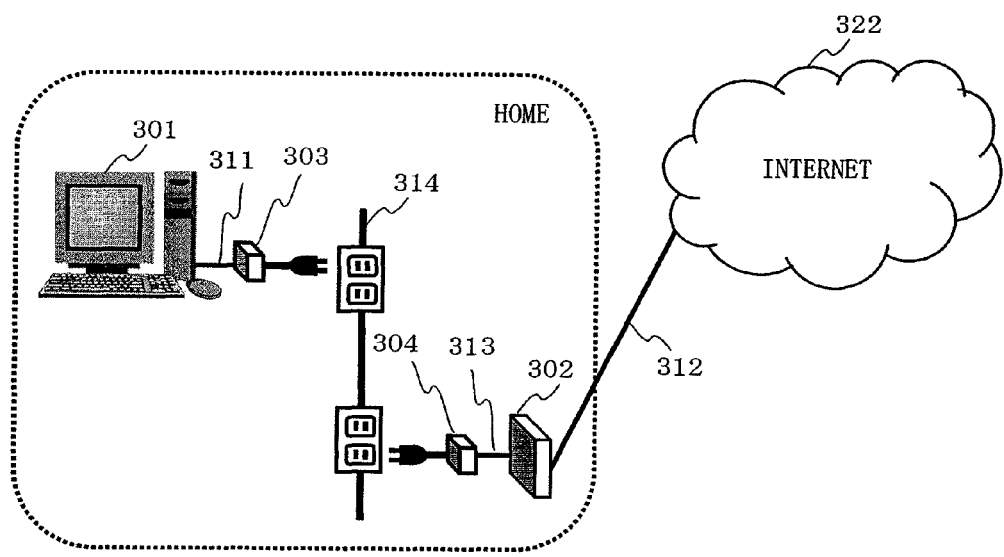
Figure 20:
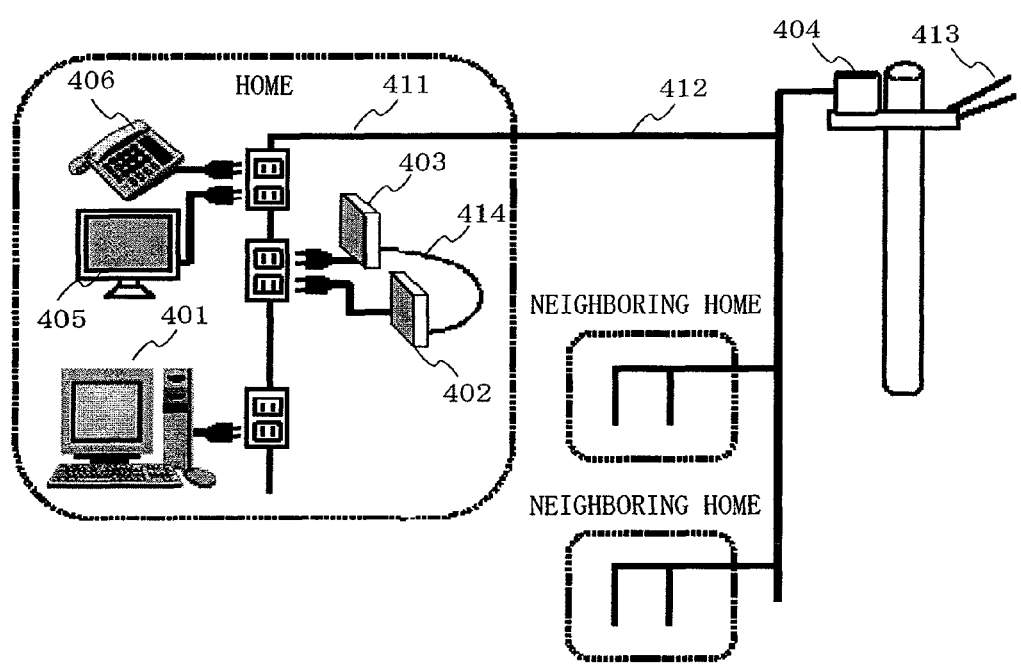

In the third embodiment, a coexistence control performed between the access communication system A and the in-home communication system B can be similarly applied between an in-home communication system B and an in-home communication system C illustrated in FIG. 17.

The first to third embodiments have been heretofore described using power line communication. In addition, when both an in-home system and an access system are configured using a wireless communication technology, the present invention disclosed herein is similarly applicable.

Note that the whole or a part of the functional blocks constituting each controller described in the first to third embodiments may be typically implemented as an integrated circuit (LSI, LSI is be called IC, system LSI, super LSI or ultra LSI, depending on the packaging density). Each functional block may be separately mounted on one chip, or a part or the whole of the functional blocks may be mounted on one chip.

The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connection or settings of circuit cells in LSI can be reconfigured, may be used.

Furthermore, if an integrated circuit technology which replaces LSI is developed by an advance in the semiconductor technology or the advent of other technologies derived therefrom, the functional blocks may be packaged using such a technology. A biotechnology may be applicable.

Note that the functions of the power line communication systems of the first to third embodiments can be each implemented by causing a CPU to interpret and execute predetermined program data capable of executing the above-described procedure, the program being stored in a storage apparatus (a ROM, a RAM, a hard disk, etc.). In this case, the program data may be stored into the storage apparatus via a recording medium, or may be executed directly from the recording medium. The recording medium refers to a semiconductor memory, such as a ROM, a RAM, a flash memory or the like; a magnetic disk memory, such as a flexible disk, a hard disk or the like; an optical disc, such as a CD-ROM, a DVD, a BD or the like; a memory card; or the like. The recording medium is a concept including a communication medium, such as a telephone line, a transfer line, or the like.

The in-home communication apparatus of the present invention may be in the form of an adaptor which converts a signal interface, such as Ethernet interface, IEEE1394 interface, USB interface, or the like, into interface for power line communication, and thereby, can be connected to multimedia apparatuses, such as a personal computer, a DVD recorder, a digital television, a home system server, and the like, which have signal interface. Thereby, a network system which transmits digital data, such as multimedia data or the like, via a power line as a medium with high speed, can be constructed. As a result, a power line which is already provided in homes, offices and the like can be directly used as a network line without newly introducing a network cable, such as a conventional wired LAN. Therefore, the present invention is considerably useful in terms of cost and ease of installation.

The functions of the present invention may be incorporated into multimedia apparatuses in the future. Thereby, data transfer can be achieved between apparatuses via a power source cable of the multimedia apparatus. In this case, an adaptor, an Ethernet cable, an IEEE1394 cable, a USB cable and the like are not required, thereby simplifying wiring. Also, the high-speed power line transmission system of the present invention can be connected via a rooter to the Internet, or via a hub to a wireless LAN or a conventional wired cable LAN, thereby extending a LAN system in which the high-speed power line transmission system of the present invention is used without any problem.

Communication data transferred via a power line by power line transmission may be intercepted by an apparatus directly connected to the power line, but is free from an eavesdrop problem with wireless LAN. Therefore, the power line transmission scheme is effective for data protection in terms of security. Further, data transferred on a power line may be protected by IPSec of an IP protocol, encryption of the contents themselves, other DRM schemes, or the like.

As compared to conventional power line communication, high-quality AV content transmission on a power line can be achieved by using a copyright protection function employing the above-described encryption of contents or efficient communication media (an effect of the present invention), and further implementing a QoS function.

While the invention has been described in detail, the foregoing description is in all aspects illustrative and not restrictive. It is understood that numerous other modifications and variations can be devised without departing from the scope of the invention.

What is claimed is:

1. A first communication apparatus that belongs to a first communication system having a highest-priority with respect to using a frequency band including a first sub-frequency band and a second sub-frequency band, the first communication system being one of a plurality of communication systems coexisting on the same communication medium, each of the plurality of communication systems having a given predetermined priorities with respect to using the frequency band, an upper limit and a lower limit of the frequency band being respectively defined as F_MAX and F_MIN, the first communication apparatus comprising:
   a coexistence signal generator that selects, out of a plurality of candidates, F_BOUND1 which is an upper limit of the first sub-frequency band which is used by the first communication system, and generates a coexistence signal indicating the first sub-frequency band from F_MIN to F_BOUND1 is occupied and used by the first communication system, F_BOUND1 being higher than F_MIN and F_BOUND1 being lower than F_MAX; and
   a coexistence signal transmitter that transmits the coexistence signal to another communication system of the plurality of communication systems,
   wherein the first sub-frequency band is usable by the first communication system or the other communication system, and the second sub-frequency band upper than the first sub-frequency band is usable only by the other communication system.

2. The first communication apparatus according to claim 1, wherein
   a period for data communication is divided into a plurality of time slots, and
   the coexistence signal generator generates a coexistence signal having a matrix structure in which an occupied and used frequency band and a time slot are specified.

3. The first communication apparatus according to claim 1, wherein the coexistence signal comprising: a time slot indicating whether or not the first sub-frequency band from F_MIN to F_BOUND1 is used; and a time slot specifying a value of F_BOUND1 when the frequency band from F_MIN to F_BOUND1 is used.

4. The first communication apparatus according to claim 1, wherein the communication medium used by the first communication system is a power line.

5. The first communication apparatus according to claim 1, wherein the communication medium used by the first communication system is a wireless medium.

6. The first communication apparatus according to claim 1, wherein
the first communication system is a system used as an access system, and the other communication system is a system used as an in-home system.

7. A second communication apparatus that belongs to a second communication system having other than a highest-priority with respect to using a frequency band including a first sub-frequency band and a second sub-frequency band, the second communication system being one of a plurality of communication systems coexisting on the same communication medium, each of the plurality of communication systems having a given predetermined priorities with respect to using the frequency band, an upper limit and a lower limit of the frequency band being respectively defined as F_MAX and F_MIN, the second communication apparatus comprising:
a coexistence signal receiver that receives, from a first communication system having the highest-priority use right, a first coexistence signal indicating that the first sub-frequency band from F_MIN to F_BOUND1 is occupied and used by the first communication system, F_BOUND1 being selected by the first communication system, F_BOUND1 being higher than F_MIN and F_BOUND1 being lower than F_MAX, and
a frequency band determiner that determines a third sub-frequency band which is to be occupied and used by the second communication system, the third sub-frequency band which is included in the second sub-frequency band upper than the first sub-frequency band indicated by the first coexistence signal,
wherein the first sub-frequency band is usable by one of the first communication system, the second communication system, and the other communication system, and the second sub-frequency band is usable by one of communication systems other than the first communication system.

8. The communication apparatus according to claim 7, further comprising
a coexistence signal generator that generates a second coexistence signal indicating the third sub-frequency band; and
a coexistence signal transmitter that transmits the second coexistence signal to a communication system other than the second communication system.

9. The second communication apparatus according to claim 7, wherein a period for data communication is divided into a plurality of time slots.

10. The second communication apparatus according to claim 7, wherein the second coexistence signal comprising: a time slot indicating whether or not the frequency band from F_MIN to F_BOUND1 is used; and a time slot specifying a value of F_BOUND1 when the frequency band from F_MIN to F_BOUND1 is used.

11. The second communication apparatus according to claim 7, wherein the communication medium used by the second communication system is a power line.

12. The second communication apparatus according to claim 7, wherein the communication medium used by the second communication system is a wireless medium.

13. The second communication apparatus according to claim 7, wherein the first communication system is a system used as an access system, and each of the second communication system and the other communication system is a system used as an in-home system.

14. An integrated circuit used in a first communication apparatus that belongs to a first communication system having a highest-priority with respect to using a frequency band including a first sub-frequency band and a second sub-frequency band, the first communication system being one of a plurality of communication systems coexisting on the same communication medium, each of the plurality of communication systems having a given predetermined priorities with respect to using the frequency band, an upper limit and a lower limit of the frequency band being respectively defined as F_MAX and F_MIN, wherein
circuits functioning as the following sections are integrated on the integrated circuit:
a coexistence signal generating section that selects, out of a plurality of candidates, F_BOUND1 which is an upper limit of the first sub-frequency band which is used by the first communication system, and generates a coexistence signal indicating the first sub-frequency band from F_MIN to F_BOUND1 is occupied and used by the first communication system, F_BOUND1 being higher than F_MIN and F_BOUND1 being lower than F_MAX; and
a coexistence signal transmitting section that transmits the coexistence signal to another communication system of the plurality of communication systems,
wherein the first sub-frequency band is usable by the first communication system or the other communication system, and the second sub-frequency band upper than the first sub-frequency band is usable only by the other communication system.

15. An integrated circuit used in a second communication apparatus that belongs to a second communication system having other than a highest-priority with respect to using a frequency band including a first sub-frequency band and a second sub-frequency band, the second communication system being one of a plurality of communication systems coexisting on the same communication medium, each of the plurality of communication systems having a given predetermined priorities with respect to using the frequency band, an upper limit and a lower limit of the frequency band being respectively defined as F_MAX and F_MIN, wherein
circuits functioning as the following sections are integrated on the integrated circuit:
a coexistence signal receiving section that receives, from a first communication system having the highest-priority use right, a first coexistence signal indicating that the first sub-frequency band from F_MIN to F_BOUND1 is occupied and used by the first communication system, F_BOUND1 being selected by the first communication system, F_BOUND1 being higher than F_MIN and F_BOUND1 being lower than F_MAX; and
a frequency band determining section that determines a third sub-frequency band which is to be occupied and used by the second communication system, the third sub-frequency band which is included in the second sub-frequency band upper than the first sub-frequency band indicated by the first coexistence signal,
wherein the first sub-frequency band is usable by one of the first communication system, the second communication system, and the other communication system, and the second sub-frequency band is usable by one of communication systems other than the first communication system.

16. The second communication apparatus according to claim 8, wherein the coexistence signal has a matrix structure in which an occupied and used frequency band and a time slot are specified.

17. A communication method used in a first communication system, having a highest-priority use right, of a plurality of communication systems, which are given predetermined priorities with respect to a right to use a frequency band of which an upper limit and a lower limit are respectively defined as F_MAX and F_MIN, coexist on the same communication medium, the method comprising:
  selecting, out of a plurality of candidates, F_BOUND1 which is an upper limit of the first sub-frequency band which is used by the first communication system;
  generating a coexistence signal indicating the first sub-frequency band from F_MIN to F_BOUND1 is occupied and used by the first communication system, F_BOUND1 being higher than F_MIN and F_BOUND1 being lower than F_MAX; and
  transmitting the coexistence signal to another communication system of the plurality of communication systems,
  wherein the first sub-frequency band is usable by the first communication system or the other communication system, and the second sub-frequency band upper than the first sub-frequency band is usable only by the other communication system.

18. A communication method used in a first communication system, having a use right other than a highest-priority use right, of a plurality of communication systems, which are given predetermined priorities with respect to a right to use a frequency band of which an upper limit and a lower limit are respectively defined as F_MAX and F_MIN, coexist on the same communication medium, the method comprising:
  receiving, from a first communication system having the highest-priority use right, a first coexistence signal indicating a frequency band from F_MIN to F_BOUND1, F_BOUND1 being selected by the first communication system, F_BOUND1 being higher than F_MIN and F_BOUND1 being lower than FMAX, which is occupied and used by the first communication system; and
  determining a third sub-frequency band which is to be occupied and used by the second communication system, the third sub-frequency band which is included in the second sub-frequency band upper than the first sub-frequency band indicated by the first coexistence signal,
  wherein the first sub-frequency band is usable by one of the first communication system, the second communication system, and the other communication system, and the second sub-frequency band is usable by one of communication systems other than the first communication system.

* * * * *